(12) United States Patent
Lin

(10) Patent No.: US 9,041,656 B2
(45) Date of Patent: May 26, 2015

(54) KEYBOARD DEVICE FOR SMALL SIZE TABLET PERSONAL COMPUTER

(71) Applicant: Primax Electronics Ltd., Neihu, Taipei (TW)

(72) Inventor: Chih-Hung Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 108 days.

(21) Appl. No.: 14/034,657

(22) Filed: Sep. 24, 2013

(65) Prior Publication Data

US 2014/0098026 A1 Apr. 10, 2014

Related U.S. Application Data

(60) Provisional application No. 61/710,258, filed on Oct. 5, 2012.

(51) Int. Cl.
*G06F 3/02* (2006.01)
*G06F 1/16* (2006.01)

(52) U.S. Cl.
CPC ............ *G06F 3/0208* (2013.01); *G06F 1/1632* (2013.01); *G06F 1/1626* (2013.01); *G06F 1/1669* (2013.01)

(58) Field of Classification Search
CPC .... G06F 3/0202; G06F 3/0219; G06F 3/0213
USPC ....................... 345/168–169, 905; 341/21–23; 361/600, 679.01, 679.02, 679.55, 681
See application file for complete search history.

(56) References Cited

U.S. PATENT DOCUMENTS

| | | | |
|---|---|---|---|
| 6,825,832 B2* | 11/2004 | Chung et al. ................... | 345/168 |
| 8,896,539 B2* | 11/2014 | Knighton et al. .............. | 345/168 |
| 2013/0201109 A1* | 8/2013 | Knighton et al. .............. | 345/169 |
| 2013/0238829 A1* | 9/2013 | Laycock et al. ............... | 710/303 |

* cited by examiner

*Primary Examiner* — Kimnhung Nguyen
(74) *Attorney, Agent, or Firm* — Kirton McConkie; Evan R. Witt

(57) ABSTRACT

A keyboard device for a small size tablet personal computer is provided. The keyboard device includes a first casing, a connecting plate, and a second casing. The first casing includes a first keyboard plate and a first recess. The second casing includes a second keyboard plate and a second recess. The connecting plate is connected with the first casing and the second casing. Consequently, the second casing is rotatable relative to the first casing. The first keyboard plate and the second keyboard plate are collectively defined as a whole keyboard to be operated by both hands of the user. Moreover, the small size tablet personal computer is accommodated within the first recess and the second recess collaboratively.

20 Claims, 8 Drawing Sheets

KEYBOARD DEVICE FOR SMALL SIZE TABLET PERSONAL COMPUTER

CROSS-REFERENCE TO RELATED APPLICATION

This application claims priority to U.S. Provisional Patent Application No. 61/710,258 entitled "KEYBOARD DEVICE FOR SMALL SIZE TABLET PERSONAL COMPUTER" filed Oct. 5, 2012, the contents of which are incorporated herein by reference.

FIELD OF THE INVENTION

The present invention relates to a keyboard device, and more particularly to a keyboard device for a small size tablet personal computer.

BACKGROUND OF THE INVENTION

Generally, the peripheral input device of a computer includes for example a mouse device, a keyboard device or a trackball device. Via the keyboard device, the user may input characters and symbols into the computer. As a consequence, most users and most manufacturers pay much attention to the development of keyboard devices.

Hereinafter, the configurations and functions of a conventional keyboard device will be illustrated with reference to FIG. 1. FIG. 1 is a schematic view illustrating the outward appearance of a conventional keyboard device. As shown in FIG. 1, plural keys 10 are exposed to a surface of the conventional keyboard device 1. When one of the plural keys 10 is depressed by the user's finger, a corresponding signal is issued to the computer, and thus the computer executes a command corresponding to the depressed key.

With increasing development of science and technology, a tablet personal computer is introduced into the market. The tablet personal computer has slim and small-sized appearance similar to a LCD screen. In addition, the display screen of the tablet personal computer is a touch screen. Via the touch screen, the user may input commands to the tablet personal computer in order to control operations of the tablet personal computer. In case that the user wants to input characters or symbols into the tablet personal computer, an on-screen keyboard is enabled and shown on the touch screen of the tablet personal computer. The on-screen keyboard is a virtual keyboard simulating the real keyboard device. By touching icons of the on-screen keyboard, corresponding characters or symbols are inputted into the tablet personal computer. In other words, characters or symbols may be directly inputted into the tablet personal computer without the need of using any external keyboard device.

Although the on-screen keyboard simulating the real keyboard device may be shown on the tablet personal computer and it is not necessary to use an external keyboard device to input characters or symbols, there are still some drawbacks. For example, since the tablet personal computer has the small-sized and slim appearance, the size of the touch screen of the tablet personal computer is about 9.7 inches. Due to the limitation of the size of the touch screen, the on-screen keyboard shown on the touch screen is much smaller than the real keyboard device. Since the on-screen keyboard is too small and the icons of the on-screen keyboard are crowded, the possibility of erroneously touching other icons during the process of operating the on-screen keyboard will be increased. Consequently, in many circumstances, the user prefers using an additional external keyboard device that has functions and configurations similar to the keyboard device as shown in FIG. 1. After the external keyboard device is in communication with the tablet personal computer, the user may input characters or symbols via the external keyboard device. However, after the external keyboard device is in communication with the tablet personal computer, the tablet personal computer should be placed and supported on a prop stand (e.g. a bookshelf). Meanwhile, the tablet personal computer is considered as a general display screen, and the external keyboard device is used for inputting characters or symbols. Generally, the external keyboard device is connected with the tablet personal computer via a universal serial bus (USB).

From the above discussions, the use of the external keyboard device may facilitate the user to operate the tablet personal computer according to the usual practice of the user. However, for allowing the user to view the touch screen of the tablet personal computer, the tablet personal computer should be placed on the prop stand in order to be in an upright status or an inclined status. Consequently, a keyboard device for a tablet personal computer and with a supporting function has been disclosed.

FIG. 2 is a schematic perspective view illustrating a conventional keyboard device for a tablet personal computer and with a supporting function. As shown in FIG. 2, the keyboard device 2 comprises a base 20, and upper cover 21, and plural keys 22. The upper cover 21 is connected with the base 20, and rotatable relative to the base 20. Consequently, the keyboard device 2 may be selectively in a folded status or a supporting status. In case that the keyboard device 2 is in the folded status, the base 20 is covered by the upper cover 21, so that the keyboard device 2 is shaped as a rectangular slab. In case that the keyboard device 2 is in the supporting status, a first included angle A1 is formed between the upper cover 21 and the base 20. Meanwhile, a tablet personal computer 23 may be placed on the base 20 and supported by the upper cover 21. The plural keys 22 are disposed on the base 20. When the plural keys 22 are depressed by the user, corresponding key signals are generated and issued to the tablet personal computer 23. The upper cover 21 has a foldable plate 211. The foldable plate 211 is foldable relative to the upper cover 21. Consequently, the foldable plate 211 is in parallel with the upper cover 21, or a second included angle A2 is formed between the foldable plate 211 and the upper cover 21. Moreover, the base 20 has a prop tray 201. The prop tray 201 is stored within the base 20. The prop tray 201 has plural stopping ribs 2011. The plural stopping ribs 2011 are protruded upwardly from a surface of the prop tray 201. In case that the keyboard device 2 is in the supporting status, the plural keys 22 are exposed, the prop tray 201 is pulled out from the base 20, and the foldable plate 211 is folded relative to the upper cover 21 to be contacted with the prop tray 201. The stopping ribs 2011 of the prop tray 201 are used for stopping the foldable plate 211 in order to support the upper cover 21. As shown in FIG. 2, the foldable plate 211 is stopped by one of the stopping ribs 2011, and the tablet personal computer 23 on the base 20 is supported by the upper cover 21 in an inclined status. Under this circumstance, a touch screen 231 of the tablet personal computer 23 may be viewed by the user, and the exposed keys 22 may be used to input characters or symbols.

In the keyboard device 2, the size of the upper cover 21 is substantially identical to the size of the base 20, and the size of the upper cover 21 is slightly larger than the size of the tablet personal computer 23. For example, if the touch screen 231 of the tablet personal computer 23 is about 9.7 inches, the size of the upper cover 21 and the size of the base 20 are slightly larger than 9.7 inches. Moreover, the plural keys 22 should be disposed on the base 20 that has the above-mentioned size. Due to the size limitation, the sizes of the plural keys 22 are smaller than the sizes of the plural keys 10 of the conventional keyboard device 1, but the sizes of the plural keys 22 are still larger than the plural icons shown on the touch screen 231. Consequently, the plural keys 22 on the base 20 can be normally operated by the user.

Recently, the general trends in designing electronic devices are toward small size, light weightiness and easy portability. Consequently, a small size tablet personal computer has been introduced into the market. For example, the size of the touch screen of the small size tablet personal computer is about 7 inches. Since the size of the on-screen keyboard shown on the 7-in touch screen of the small size tablet personal computer is smaller than the size of the on-screen keyboard shown on the 9.7-in touch screen of the tablet personal computer, the use of the small size tablet personal computer becomes hindrance from touching the plural icons of the on-screen keyboard. In case that the above keyboard device 2 for the tablet personal computer is applied to the small size tablet personal computer, the sizes of the upper cover 21 and the base 20 should be correspondingly scaled down. That is, the sizes of the plural keys 22 are correspondingly reduced. Under this circumstance, the possibility of erroneously touching other keys and the possibility of erroneously inputting characters or symbols will be increased.

Therefore, there is a need of providing a keyboard device for a small size tablet personal computer in order to reduce the possibility of erroneously touching other keys.

SUMMARY OF THE INVENTION

The present invention provides a keyboard device for a small size tablet personal computer in order to reduce the possibility of erroneously touching other keys.

The present invention also provides a keyboard device for a small size tablet personal computer, in which the keyboard device can be carried easily.

In accordance with an aspect of the present invention, there is provided a keyboard device for supporting a small size tablet personal computer and storing the small size tablet personal computer. The keyboard device includes a first casing, a connecting plate, and a second casing. The first casing includes a first keyboard plate and a first recess. The first keyboard plate is disposed on an inner surface of the first casing, and includes plural first keys. When the plural first keys are depressed, plural first key signals are correspondingly generated. The first recess is formed in the inner surface of the first casing and located at a side of the first keyboard plate for partially accommodating the small size tablet personal computer. A first lateral edge of the connecting plate is connected with the first casing. The connecting plate is rotatable relative to the first casing. The second casing is connected with a second lateral edge of the connecting plate. The second casing is rotatable relative to the connecting plate, so that the first casing and the second casing are collaboratively in a folded status or an unfolded status. The second casing includes a second keyboard plate and a second recess. The second keyboard plate is disposed on an inner surface of the second casing, and includes plural second keys. When the plural second keys are depressed, plural second key signals are correspondingly generated. The second recess is formed in the inner surface of the second casing and located at a side of the second keyboard plate. When the first casing and the second casing are in the unfolded status, the small size tablet personal computer is permitted to be accommodated within the first recess and the second recess collaboratively.

In accordance with another aspect of the present invention, there is provided a keyboard device for supporting a small size tablet personal computer and storing the small size tablet personal computer. The keyboard device includes a flexible connecting plate, a first casing, and a second casing. The first casing is disposed on an inner surface of the flexible connecting plate, and located at a first side of the flexible connecting plate. The first casing includes a first keyboard plate and a first recess. The first keyboard plate is disposed on an inner surface of the first casing, and includes plural first keys. When the plural first keys are depressed, plural first key signals are correspondingly generated. The first recess is formed in the inner surface of the first casing and located at a side of the first keyboard plate for partially accommodating the small size tablet personal computer. The second casing is disposed on the inner surface of the flexible connecting plate, and located at a second side of the flexible connecting plate. The second casing is rotatable relative to the first casing, so that the flexible connecting plate is selectively in a folded status or an unfolded status. The second casing includes a second keyboard plate and a second recess. The second keyboard plate is disposed on an inner surface of the second casing, and includes plural second keys. When the plural second keys are depressed, plural second key signals are correspondingly generated. The second recess is formed in the inner surface of the second casing and located at a side of the second keyboard plate. When the flexible connecting plate is in the unfolded status, the small size tablet personal computer is permitted to be accommodated within the first recess and the second recess collaboratively.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional keyboard device, the present invention provides a keyboard device for a small size tablet personal computer.

Figure 1:
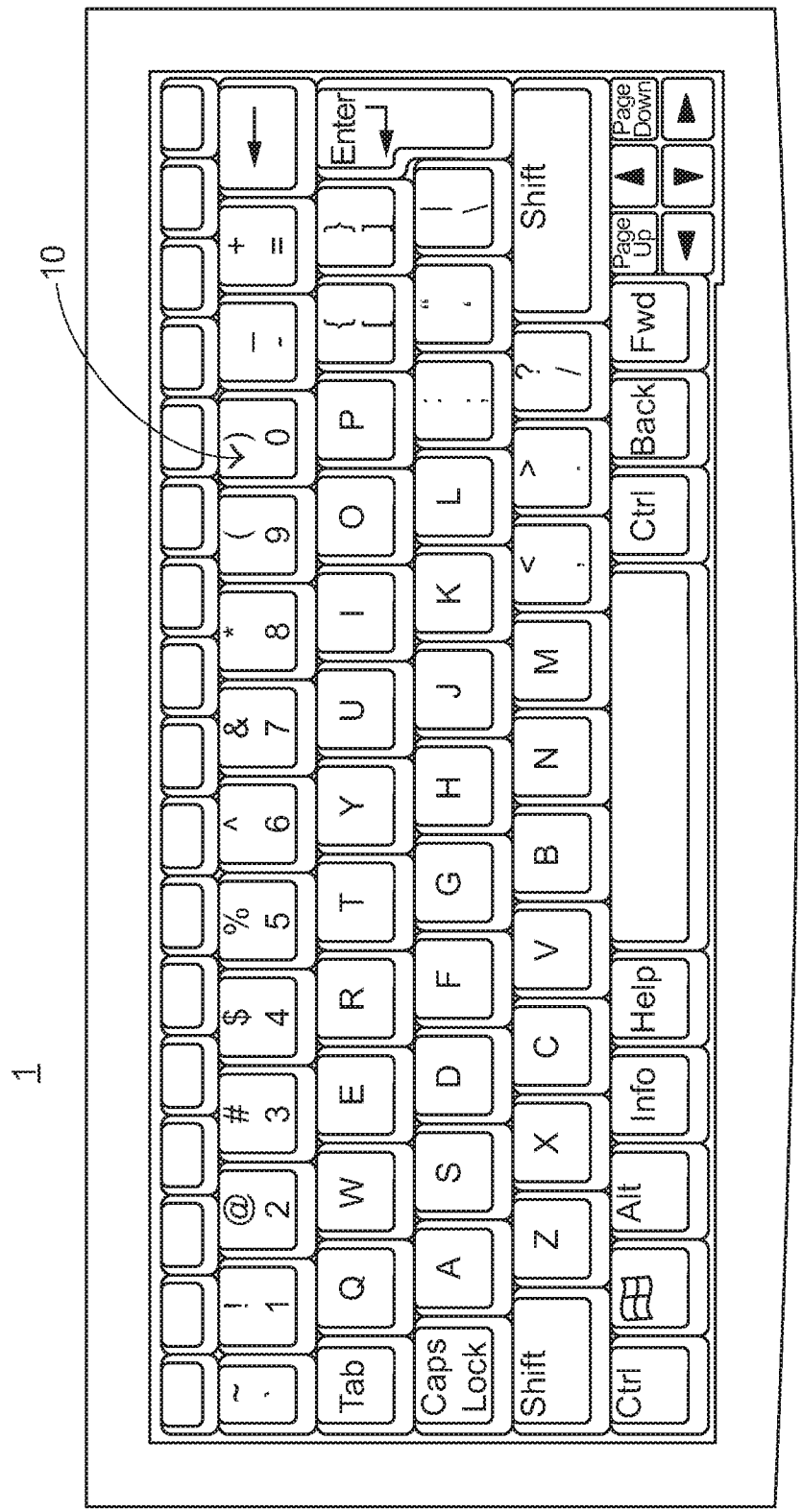
FIG. 1 is a schematic view illustrating the outward appearance of a conventional keyboard device.
Figure 2:
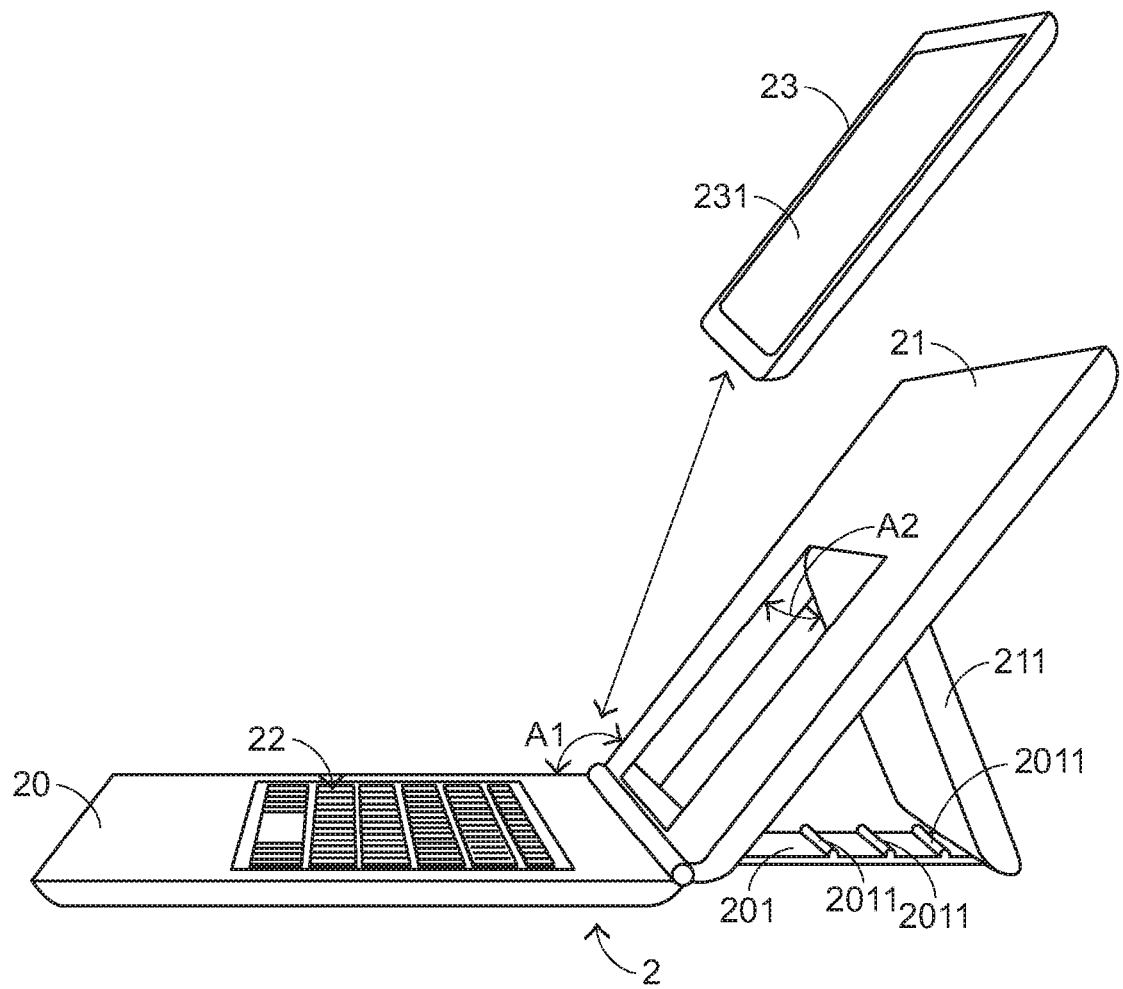
FIG. 2 is a schematic perspective view illustrating a conventional keyboard device for a tablet personal computer and with a supporting function.
Figure 3:
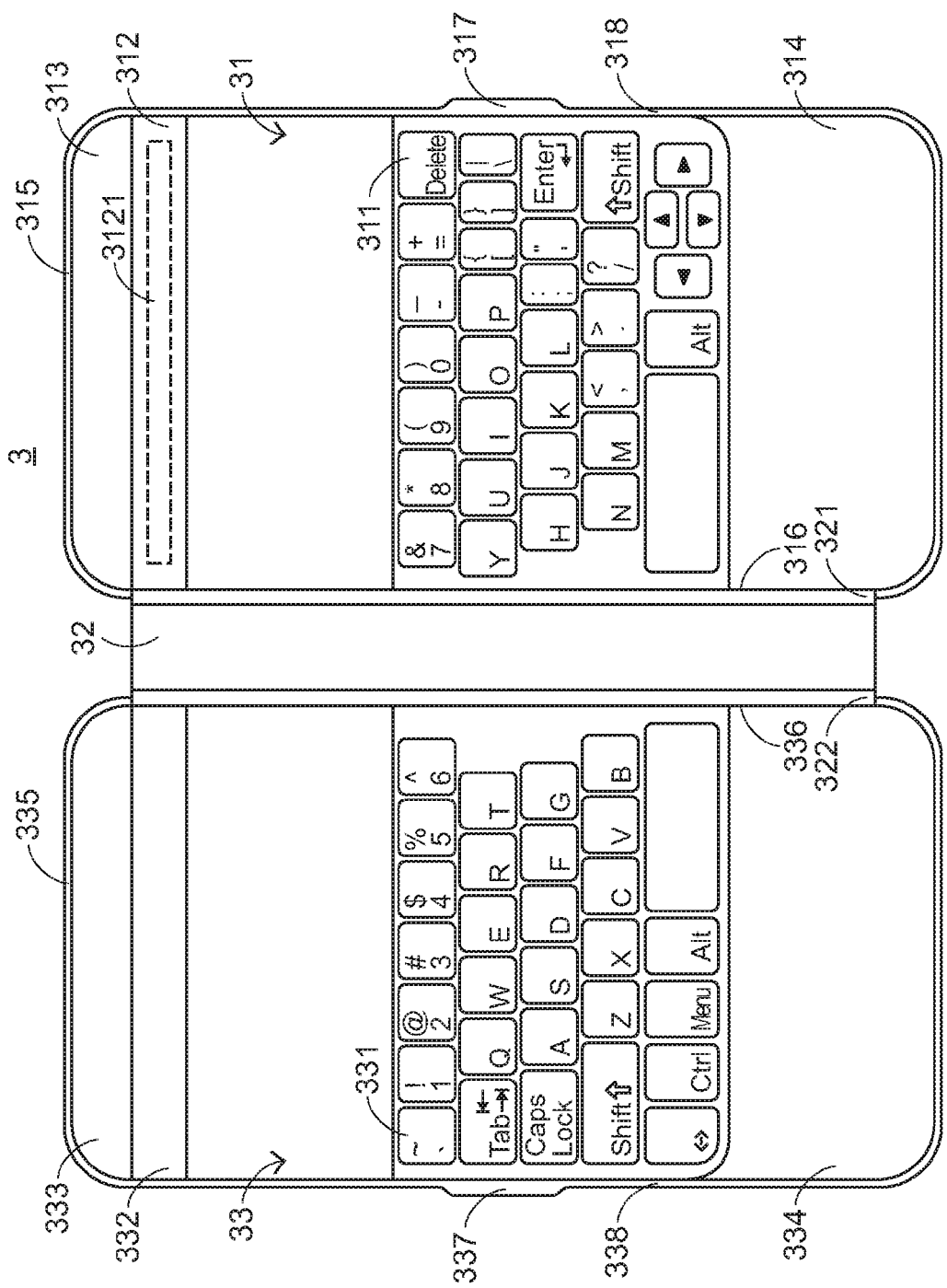
FIG. 3 is a schematic top view illustrating a keyboard device for a small size tablet personal computer according to a first embodiment of the present invention, in which the keyboard device is in an unfolded status.

FIG. 3 is a schematic top view illustrating a keyboard device for a small size tablet personal computer according to a first embodiment of the present invention, in which the keyboard device is in an unfolded status. The keyboard device 3 can support a small size tablet personal computer 4 (see FIG. 4) and store the small size tablet personal computer 4 therein. In this embodiment, the keyboard device 3 comprises a first casing 31, a connecting plate 32, and a second casing 33. The small size tablet personal computer 4 may be placed on and received by the first casing 31. The small size tablet personal computer 4 comprises a touch screen 41. In this embodiment, the size of the touch screen 41 is about 7 inches. The first casing 31 comprises a first keyboard plate 311, a first position-limiting strip 312, and a first recess 313. The first keyboard plate 311 is disposed on an inner surface 314 of the first casing 31. In addition, the first keyboard plate 311 comprises plural first keys. When the plural first keys are depressed by the user, corresponding first key signals are generated. The plural first keys of the first keyboard plate 311 at least comprise numeric keys 7~0, alphabetic keys Y~P, alphabetic keys H~L, an Enter key, alphabetic keys N~M, a first Shift key, a first space key, a first Alt key, and arrow keys (e.g. the up, down, left and right arrow keys). That is, the plural first keys of the first keyboard plate 311 are the keys that are touchable by the right hand of the user.

Moreover, the first position-limiting strip 312 of the first casing 31 is disposed on the inner surface 314 of the first casing 31, and located at a second side of the first casing 31 (i.e. the top side as shown in FIG. 3). The first recess 313 is arranged between the first position-limiting strip 312 and a second lateral edge 315 of the first casing 31. The small size tablet personal computer 4 may be partially accommodated within the first recess 313. After the small size tablet personal computer 4 is partially accommodated within the first recess 313, the first position-limiting strip 312 is contacted with the small size tablet personal computer 4 in order to facilitate fixing the small size tablet personal computer 4 in the first recess 313.

The first position-limiting strip 312 comprises at least one first fixing element 3121. The at least one first fixing element 3121 is disposed within the first position-limiting strip 312. In case that the small size tablet personal computer 4 is placed on and received by the first casing 31, the small size tablet personal computer 4 may be fixed on the first casing 31 through the first fixing element 3121. In this embodiment, the first fixing element 3121 is a magnetic body, and an external case of the small size tablet personal computer 4 is made of a metallic material. When the small size tablet personal computer 4 is placed on and received by the first casing 31, the small size tablet personal computer 4 is magnetically attracted by the first fixing element 3121, so that the small size tablet personal computer 4 is fixed on the first casing 31.

Figure 5:
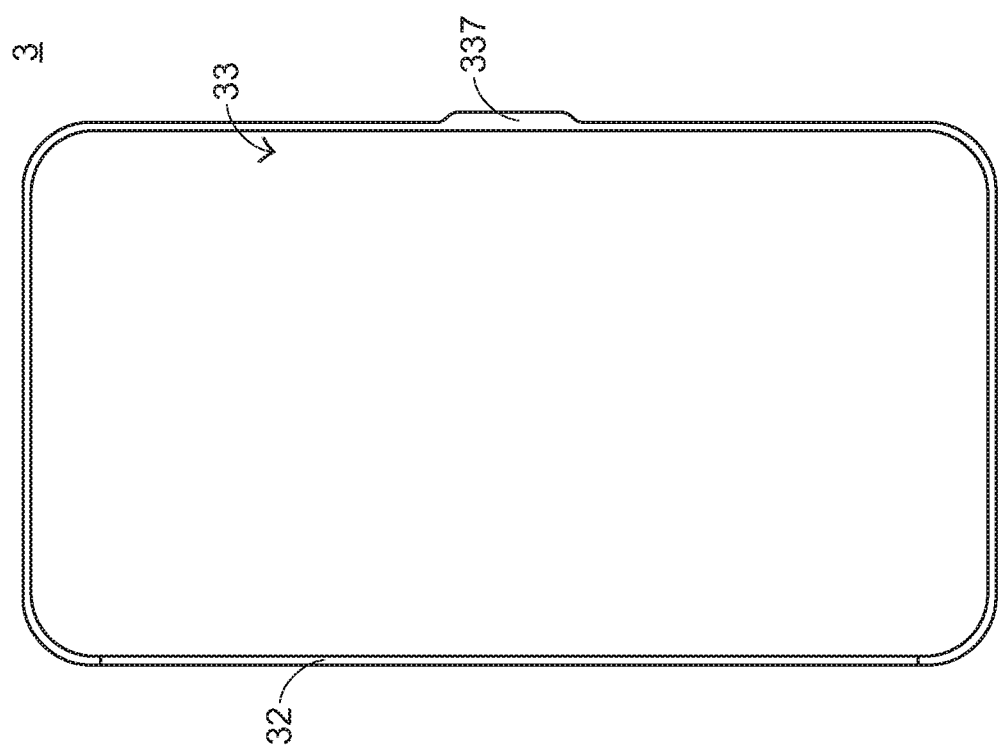
FIG. 5 is a schematic top view illustrating the keyboard device according to the first embodiment of the present invention, in which the keyboard device is in a folded status.

Please refer to FIG. 3 again. A first lateral edge 321 of the connecting plate 32 is connected with a first lateral edge 316 of the first casing 31. In addition, the connecting plate 32 is rotatable relative to the first casing 31. A second lateral edge 322 of the connecting plate 32 is connected with a first lateral edge 336 of the second casing 33. In addition, the second casing 33 is rotatable relative to the connecting plate 32. Consequently, the first casing 31 and the second casing 33 may be collaboratively in a folded status (see FIG. 5), or the first casing 31 and the second casing 33 may be collaboratively in the unfolded status (see FIG. 3).

The second casing 33 comprises a second keyboard plate 331, a second position-limiting strip 332, and a second recess 333. The second keyboard plate 331 is disposed on an inner surface 334 of the second casing 33. In addition, the second keyboard plate 331 comprises plural second keys. When the plural second keys are depressed by the user, corresponding second key signals are generated. The plural second keys of the second keyboard plate 331 at least comprise numeric keys 1~6, a Tab key, alphabetic keys Q~T, a Caps Lock key, alphabetic keys A~G, a second Shift key, alphabetic keys Z~B, a Ctrl key, a Menu key, a second Alt key, and a second space key. That is, the plural second keys of the second keyboard plate 331 are the keys that are touchable by the left hand of the user.

Please refer to FIG. 3 again. In case that the first casing 31 and the second casing 33 are in the unfolded status, the first casing 31, the connecting plate 32 and the second casing 33 are in parallel with each other. Under this circumstance, a first included angle between the first casing 31 and the connecting plate 32 is equal to 180 degrees, and a second included angle between the second casing 33 and the connecting plate 32 is equal to 180 degrees. Moreover, the overall length of the first keyboard plate 311 and the second keyboard plate 331 is substantially equal to the sum of the length of the second lateral edge 315 of the first casing 31 and the length of a second lateral edge 335 of the second casing 33.

In this embodiment, both of the first keyboard plate 311 and the second keyboard plate 331 are slim soft keyboards. Moreover, the second keyboard plate 331 is electrically connected with the first keyboard plate 311. The first keyboard plate 311 comprises a first wireless transmission module (not shown), and the small size tablet personal computer 4 comprises a second wireless transmission module (not shown). The plural first key signals generated by the first keyboard plate 311 and the plural second key signals generated by the second keyboard plate 331 may be transmitted from the first wireless transmission module to the second wireless transmission module of the small size tablet personal computer 4. In response to the plural first key signals and the plural second key signals, corresponding characters or symbols are inputted into the small size tablet personal computer 4.

The second position-limiting strip 332 of the second casing 33 is disposed on the inner surface 334 of the second casing 33, and located at a second side of the second casing 33 (i.e. the top side as shown in FIG. 3). The second recess 333 is arranged between the second position-limiting strip 332 and the second lateral edge 335 of the second casing 33. The small size tablet personal computer 4 may be partially accommodated within the second recess 333. Alternatively, the small size tablet personal computer 4 may be partially accommodated within the first recess 313 and the second recess 333 collectively. When the small size tablet personal computer 4 is partially accommodated within the second recess 333, the second position-limiting strip 332 is contacted with the small size tablet personal computer 4 in order to facilitate fixing the small size tablet personal computer 4 in the second recess 333.

In this embodiment, the at least one first fixing element 3121 is disposed within the first position-limiting strip 312. Alternatively, in some other embodiments, at least one first fixing element is disposed within the first position-limiting strip, and at least one second fixing element is disposed within the second position-limiting strip.

Please refer to FIG. 3 again. The first casing 31 further comprises a first locking element 317. The first locking element 317 is located at a third lateral edge 318 of the first casing 31. The second casing 33 further comprises a second locking element 337. The second locking element 337 is located at a third lateral edge 338 of the second casing 33. In case that the first casing 31 and the second casing 33 are collectively in the folded status, the first locking element 317 and the second locking element 337 are contacted with each other in order to maintain the folded status of the first casing 31 and the second casing 33. In this embodiment, the first locking element 317 is a magnetic body, and the second locking element 337 is a metal sheet. Alternatively, in some other embodiments, the first locking element 317 and the second locking element 337 are both magnetic bodies.

Figure 4:
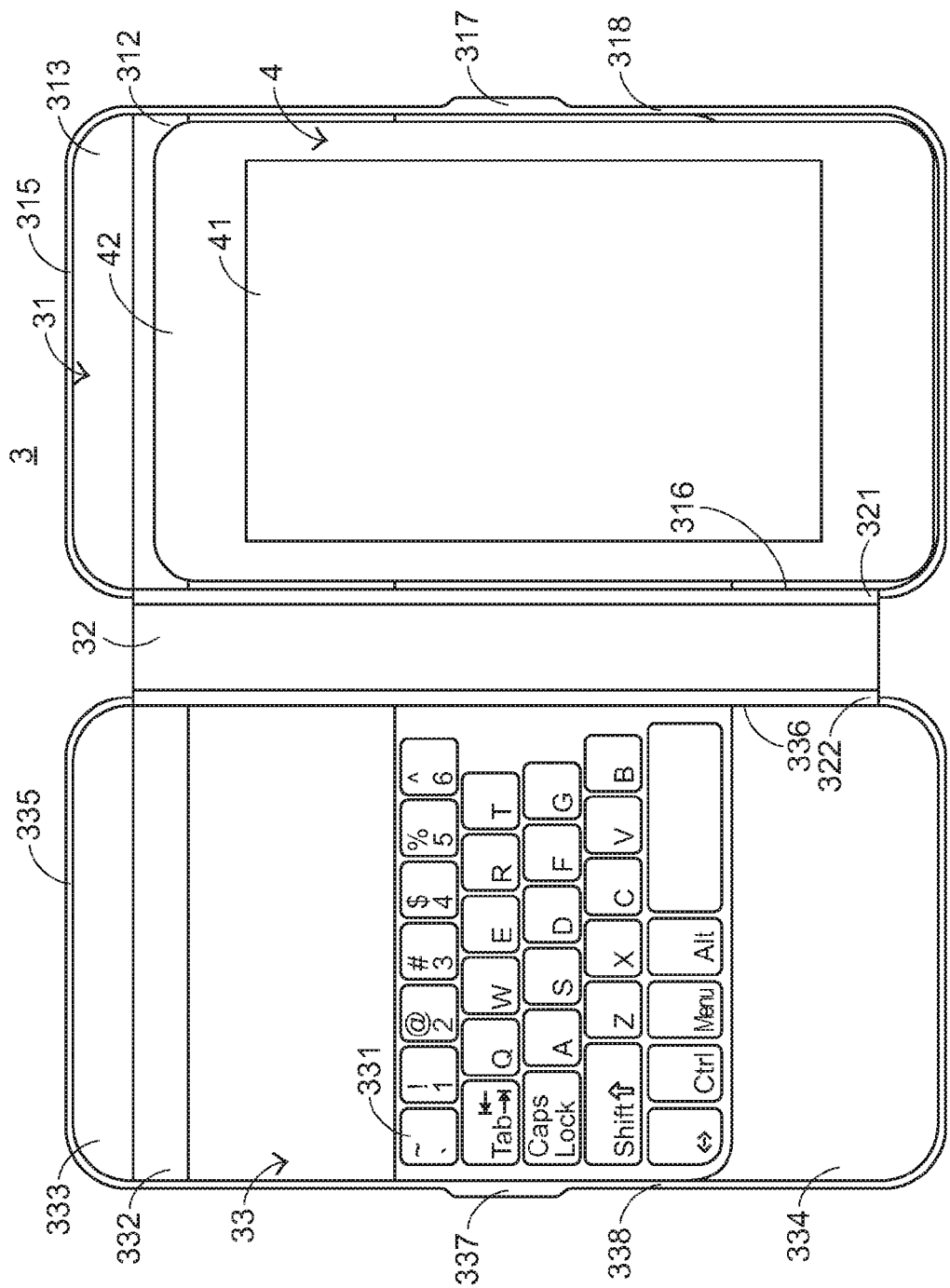
FIG. 4 is a schematic top view illustrating the keyboard device of FIG. 3, in which a small size tablet personal computer is fixed on the keyboard device.

FIG. 4 is a schematic top view illustrating the keyboard device of FIG. 3, in which a small size tablet personal computer is fixed on the keyboard device. In case that the small size tablet personal computer 4 is placed on the inner surface 314 of the first casing 31, the small size tablet personal computer 4 is disposed over the first keyboard plate 311, and a first lateral edge 42 of the small size tablet personal computer 4 is contacted with the first position-limiting strip 312. Since the at least one first fixing element 3121 is disposed within the first position-limiting strip 312, the metallic external case of the small size tablet personal computer 4 is magnetically attracted by the at least one first fixing element 3121. Consequently, the small size tablet personal computer 4 can be securely fixed on the first casing 31. Under this circumstance, the first casing 31 may be directly held by the hand of the user. At the same time, the small size tablet personal computer 4 fixed on the first casing 31 may be operated by the user.

In case that the small size tablet personal computer 4 is not used, the second casing 33 may be folded by the user. That is, the second casing 33 is rotated relative to the connecting plate 32, and the connecting plate 32 is rotated relative to the first casing 31. Consequently, the first casing 31 and the small size tablet personal computer 4 fixed on the first casing 31 are covered by the second casing 33. Under this circumstance, the keyboard device 3 is in the folded status. Meanwhile, the first locking element 317 at the third lateral edge 318 of the first casing 31 and the second locking element 337 at the third lateral edge 338 of the second casing 33 are contacted with each other in order to maintain the folded status of the first casing 31 and the second casing 33. Meanwhile, the first included angle between the first casing 31 and the connecting plate 32 is equal to or close to 90 degrees, and the second included angle between the second casing 33 and the connecting plate 32 is equal to or close to 90 degrees (see FIG. 5). Meanwhile, the small size tablet personal computer 4 is stored within the keyboard device 3. Since the small size tablet personal computer 4 is covered by the first casing 31 and the second casing 33, the influence of the external impact or the foreign liquid on the small size tablet personal computer 4 will be minimized.

Moreover, the altitude of the first position-limiting strip 312 of the first casing 31 is lower than the altitude of the second lateral edge 315 of the first casing 31, and the altitude of the second position-limiting strip 332 of the second casing 33 is lower than the altitude of the second lateral edge 335 of the second casing 33. Consequently, the small size tablet personal computer 4 can be accommodated within the region between the first casing 31 and the second casing 33 without being exposed outside the first casing 31 and the second casing 33.

Figure 6:
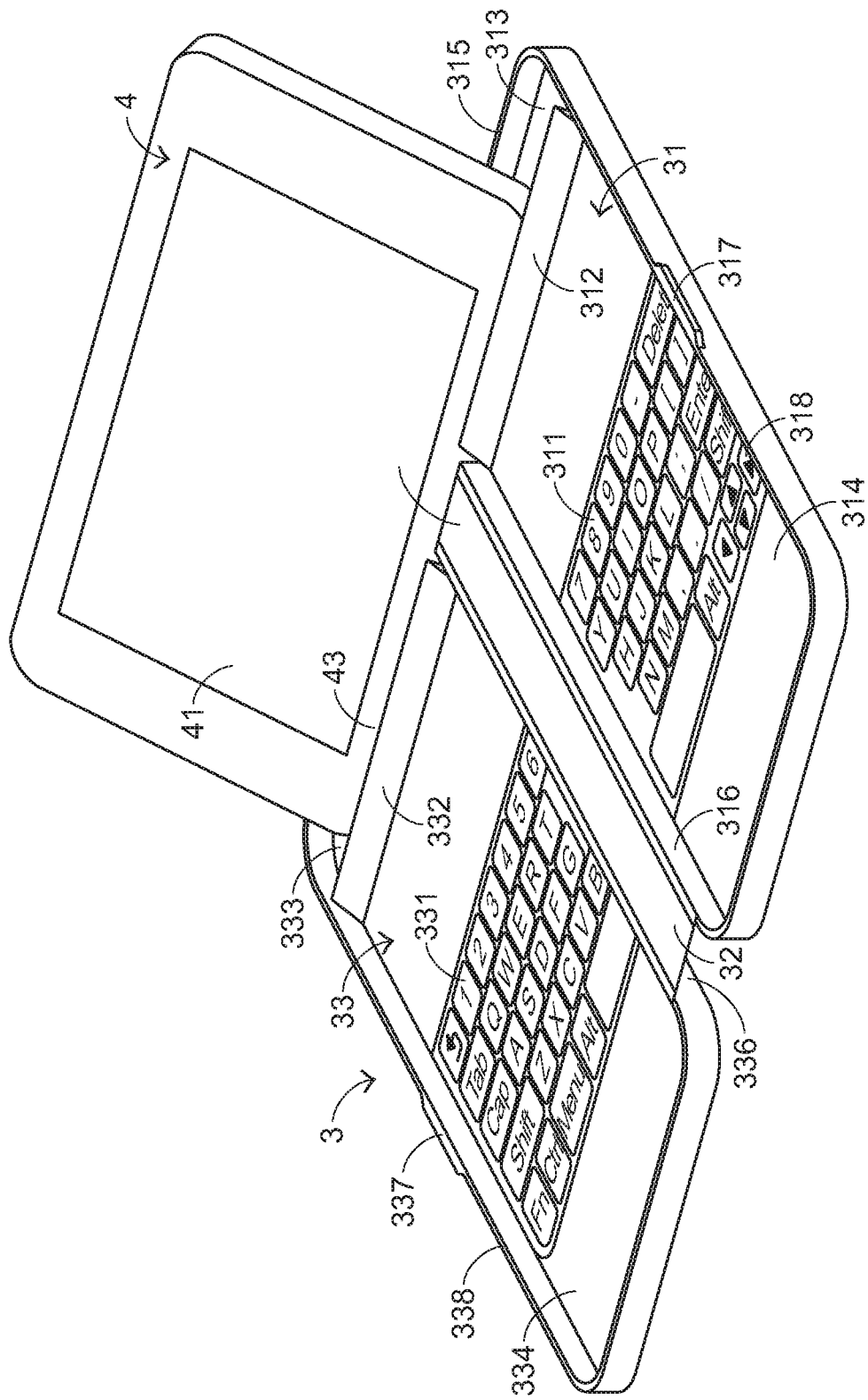
FIG. 6 is a schematic top view illustrating the keyboard device according to the first embodiment of the present invention, in which the keyboard device is in an operating status.

FIG. 6 is a schematic top view illustrating the keyboard device according to the first embodiment of the present invention, in which the keyboard device is in an operating status. For inputting characters or symbols into the small size tablet personal computer 4, the keyboard device 3 should be unfolded by the user. Consequently, the first casing 31 and the second casing 33 are in the unfolded status. Then, the small size tablet personal computer 4 is removed from the first casing 31 by the user, so that the first keyboard plate 311 of the first casing 31 is exposed. Under this circumstance, the first keyboard plate 311 and the second keyboard plate 331 are collectively defined as a whole keyboard. Then, the small size tablet personal computer 4 is placed in the first recess 313 and the second recess 333. That is, a second lateral edge 43 of the small size tablet personal computer 4 is partially accommodated within the first recess 313 and the second recess 333. In addition, the first position-limiting strip 312 and the second position-limiting strip 332 are contacted with the small size tablet personal computer 4 in order to facilitate fixing the small size tablet personal computer 4 in the first recess 313 and the second recess 333. Under this circumstance, the small size tablet personal computer 4 is in an inclined status. Consequently, the user can view the touch screen 41 of the small size tablet personal computer 4 while operating the keyboard device 3, which is defined by the first keyboard plate 311 and the second keyboard plate 331 collectively. In addition, the corresponding first key signals or second key signals may be transmitted from the keyboard device 3 to the small size tablet personal computer 4.

Figure 7:
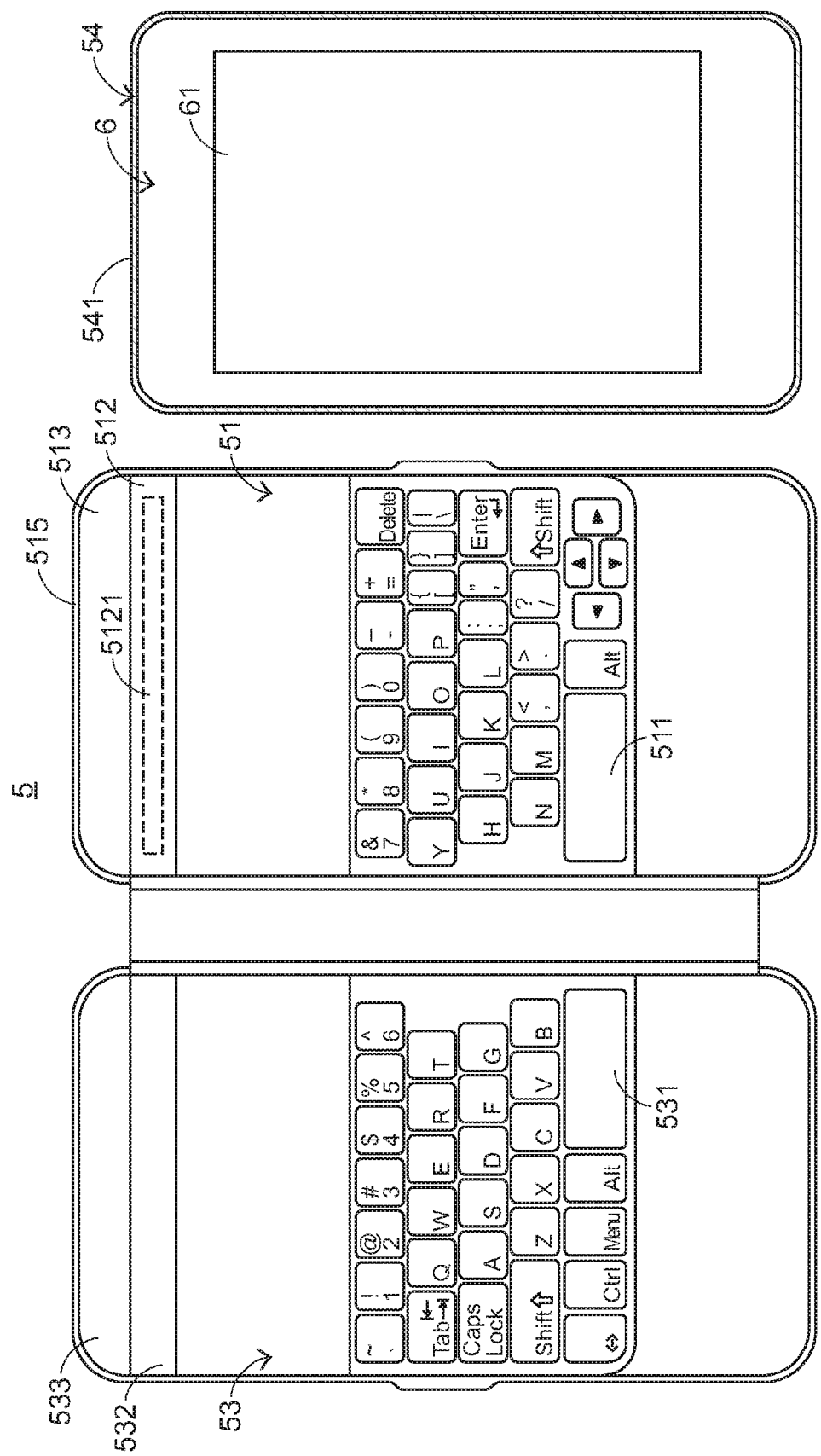
FIG. 7 is a schematic top view illustrating a keyboard device for a small size tablet personal computer according to a second embodiment of the present invention.

The present invention further provides a second embodiment. FIG. 7 is a schematic top view illustrating a keyboard device for a small size tablet personal computer according to a second embodiment of the present invention. As shown in FIG. 7, the keyboard device 5 comprises a first casing 51, a connecting plate 52, a second casing 53, and a protective cover 54. A small size tablet personal computer 6 may be placed on and received by the first casing 51. The first casing 51 comprises a first keyboard plate 511, a first position-limiting strip 512, and a first recess 513. The second casing 53 comprises a second keyboard plate 531, a second position-limiting strip 532, and a second recess 533. Except for the following three items, the structures of the keyboard device 5 are substantially identical to those of the keyboard device 3 of the first embodiment, and are not redundantly described herein.

Firstly, the keyboard device 5 of this embodiment further comprises the protective cover 54. A backside of the small size tablet personal computer 6 is covered by the protective cover 54, and the protective cover 54 is combined with the small size tablet personal computer 6. Consequently, the small size tablet personal computer 6 is protected by the protective cover 54. The protective cover 54 comprises a second fixing element (not shown). The second fixing element is disposed on a second lateral edge 541 of the protective cover 54. In case that the combination of the protective cover 54 and the small size tablet personal computer 6 is placed on and received by the first casing 51, the second fixing element of the protective cover 54 and a first fixing element 5121 of the first casing 51 are connected with each other. Consequently, the combination of the protective cover 54 and the small size tablet personal computer 6 may be fixed on the first casing 51. In an embodiment, the first fixing element 5121 and the second fixing element are both magnetic bodies. Alternatively, in some other embodiments, the first fixing element is a magnetic body, and the second fixing element is a metal sheet. Alternatively, in some other embodiments, the first fixing element is a metal sheet, and the second fixing element is a magnetic body.

The connecting relationships between associated components of the keyboard device 5 in the operating status are similar to those of the keyboard device 3 of the first embodiment. After the combination of the protective cover 54 and the small size tablet personal computer 6 is partially accommodated within the first recess 513 and the second recess 533, the first position-limiting strip 512 and the second position-limiting strip 532 are contacted with the small size tablet personal computer 6 in order to facilitate fixing the small size tablet personal computer 6 in the first recess 513 and the second recess 533. Under this circumstance, the small size tablet personal computer 6 is in an inclined status. Consequently, the user can view a touch screen 61 of the small size tablet personal computer 6 while operating the keyboard device 5, which is defined by the first keyboard plate 511 and the second keyboard plate 531 collectively. In addition, the corresponding first key signals or second key signals may be transmitted from the keyboard device 5 to the small size tablet personal computer 6.

Secondly, in this embodiment, the second keyboard plate 531 is not electrically connected with the first keyboard plate 511. In addition, the first keyboard plate 511 comprises a first wireless transmission module (not shown), the second keyboard plate 531 comprises a second wireless transmission module (not shown), and the small size tablet personal computer 6 comprises a third wireless transmission module (not shown). The plural first key signals generated by the first keyboard plate 511 may be transmitted from the first wireless transmission module of the first keyboard plate 511 to the third wireless transmission module of the small size tablet personal computer 6. In response to the plural first key signals, corresponding characters or symbols are inputted into the small size tablet personal computer 6. Similarly, the plural second key signals generated by the second keyboard plate 531 may be transmitted from the second wireless transmission module of the second keyboard plate 531 to the third wireless transmission module of the small size tablet personal computer 6. In response to the plural second key signals, corresponding characters or symbols are inputted into the small size tablet personal computer 6. In other words, the first keyboard plate 511 and the second keyboard plate 531 are independent of each other, and the first keyboard plate 511 and the second keyboard plate 531 are in communication with the small size tablet personal computer 6 individually.

Thirdly, in this embodiment, the first position-limiting strip 512 of the first casing 51 may be designed as a foldable structure. That is, the first position-limiting strip 512 is foldable relative to the first casing 51. Consequently, the altitude of the first position-limiting strip 512 of the first casing 51 may be adjusted to be higher than or lower than the altitude of a second lateral edge 515 of the first casing 51. Similarly, the second position-limiting strip 532 of the second casing 53 may also be designed as another foldable structure. The configurations of the second position-limiting strip 532 are similar to those of the first position-limiting strip 512, and are not redundantly described herein.

Figure 8:
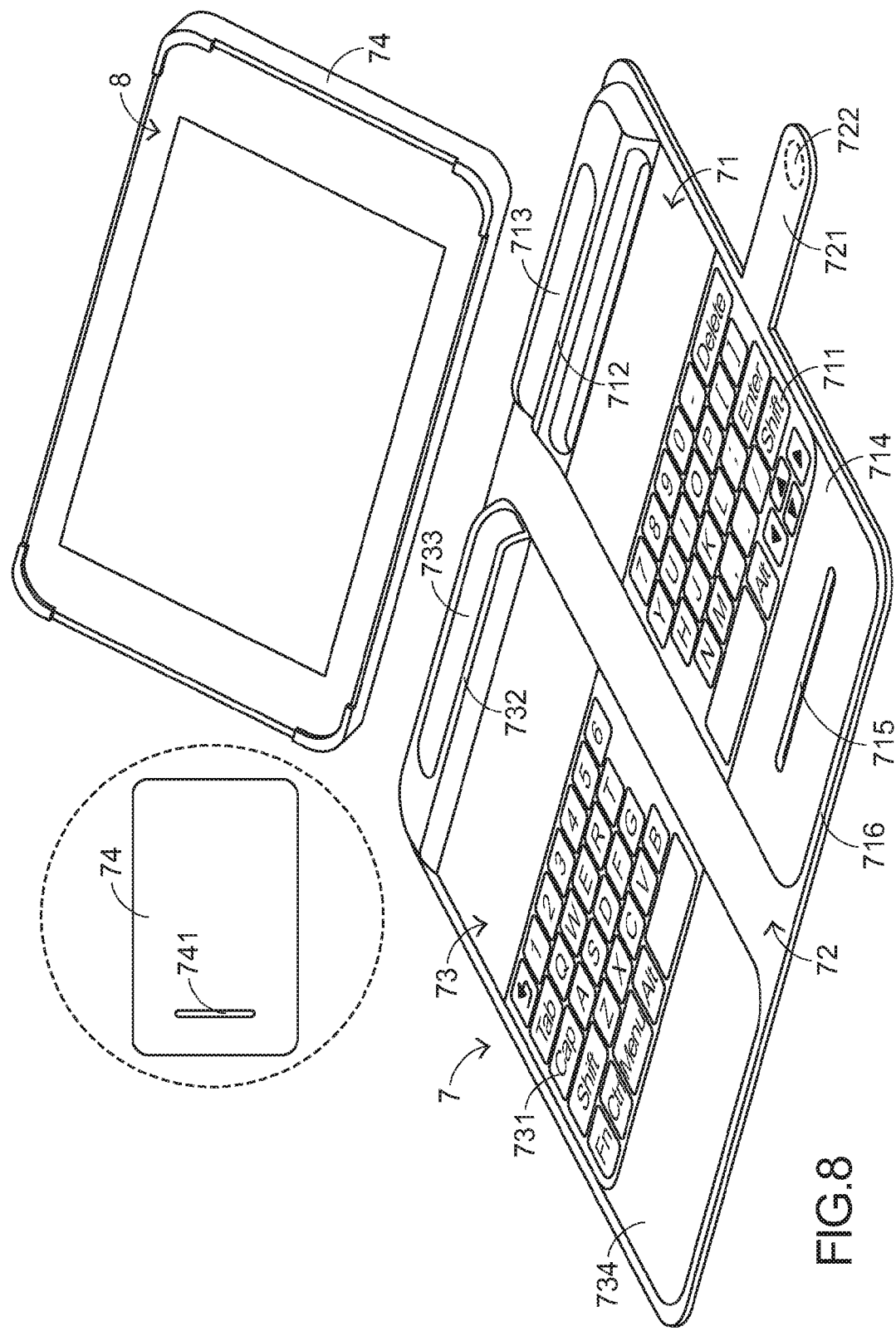
FIG. 8 is a schematic perspective view illustrating the relationship between a keyboard device and a small size tablet personal computer according to a third embodiment of the present invention.

The present invention further provides a third embodiment. FIG. 8 is a schematic perspective view illustrating the relationship between a keyboard device and a small size tablet personal computer according to a third embodiment of the present invention. As shown in FIG. 8, the keyboard device 7 comprises a first casing 71, a flexible connecting plate 72, a second casing 73, and a protective cover 74. The first casing 71 is disposed on an inner surface of the flexible connecting plate 72, and located at a first side of the flexible connecting plate 72. A small size tablet personal computer 8 may be placed on and received by the first casing 71. The first casing 71 comprises a first keyboard plate 711, a first position-limiting strip 712, and a first recess 713. The second casing 73 is disposed on the inner surface of the flexible connecting plate 72, and located at a second side of the flexible connecting plate 72. The second casing 73 comprises a second keyboard plate 731, a second position-limiting strip 732, and a second recess 733. Except for the following items, the structures of the first casing 71 and the second casing 73 of the keyboard device 7 are substantially identical to those of the first casing 51 and the second casing 53 of the keyboard device 5 of the second embodiment, and are not redundantly described herein.

In comparison with the keyboard device 5 of the second embodiment, the keyboard device 7 of this embodiment is distinguished in the following four items.

Firstly, the first casing 71 and the second casing 73 of the keyboard device 7 are disposed on the inner surface of the flexible connecting plate 72. The first casing 71 and the second casing 73 are located at the first side and the second side of the flexible connecting plate 72, respectively. In case that the second casing 73 is rotated relative to the first casing 71, the flexible connecting plate 72 is selectively in a folded status or an unfolded status. In this embodiment, the flexible connecting plate 72 is made of leather.

Secondly, the flexible connecting plate 72 comprises an extension part 721, a first locking element 722, and a second locking element (not shown). The extension part 721 is extended from the first side of the flexible connecting plate 72. The first locking element 722 is disposed within the extension part 721. The second locking element is located at the second side of the flexible connecting plate 72. In case that the flexible connecting plate 72 is in the folded status, the extension part 721 may be contacted with the second side of the flexible connecting plate 72 and the first locking element 722 may be close to the second locking element in order to maintain the folded status of the flexible connecting plate 72. In this embodiment, the first locking element 722 and the second locking element are both magnetic bodies for providing magnetic forces. Due to the magnetic forces, the folded status of the flexible connecting plate 72 can be maintained.

Thirdly, a first position-limiting strip 712 of the keyboard device 7 is disposed on an inner surface 714 of the first casing 71, and located at a sidewall of the first recess 713. In addition, a second position-limiting strip 732 of the keyboard device 7 is disposed on an inner surface 734 of the second casing 73, and located at a sidewall of the second recess 733. The functions of the first position-limiting strip 712 and the second position-limiting strip 732 of the keyboard device 7 are similar to those of the keyboard device 5 of the second embodiment, and are not redundantly described herein.

Fourthly, the first casing 71 further comprises a first fixing element 715. The first fixing element 715 is disposed on the inner surface 714 of the first casing 71, and located near a third lateral edge 716 of the first casing 71. In addition, the protective cover 74 comprises a second fixing element 741. The second fixing element 741 is disposed on a lateral edge of the protective cover 74. After the protective cover 74 is combined with the small size tablet personal computer 8 and the combination of the protective cover 74 and the small size tablet personal computer 8 is placed on and received by the first casing 71, the second fixing element 741 and the first fixing element 715 are connected with each other. Consequently, the combination of the protective cover 74 and the small size tablet personal computer 8 may be fixed on the inner surface 714 of the first casing 71. In an embodiment, the first fixing element 715 is a concave structure, and a magnetic body is disposed within the concave structure. The second fixing element 741 is a protrusion structure corresponding to the concave structure, and another magnetic body is disposed within the protrusion structure. When the second fixing element 741 and the first fixing element 715 are connected with each other, the magnetic forces generated by these two magnetic bodies can result in secure connection between the second fixing element 741 and the first fixing element 715.

From the above descriptions, the present invention provides a keyboard device for a small size tablet personal computer. The plural keys of a general keyboard device are distributed to the first keyboard plate and the second keyboard plate of the keyboard device of the present invention. The first keyboard plate and the second keyboard plate are disposed on the inner surfaces of the first casing and the second casing, respectively. In case that the first casing and the second casing are in the unfolded status, the first keyboard plate and the second keyboard plate are respectively exposed outside the first casing and the second casing, and the first keyboard plate and the second keyboard plate are collectively defined as a whole keyboard to be operated by both hands of the user. The overall length of the keyboard device is substantially equal to the sum of the length of the first keyboard plate and the length of the second keyboard plate (i.e. the sum of the length of the second side edge of the first casing and the length of the second side edge of the second casing). In other words, the size of the whole keyboard defined by the first keyboard plate and the second keyboard plate becomes larger. Consequently, during the process of operating the keyboard device of the present invention, the possibility of erroneously inputting characters or symbols will be largely reduced. Moreover, the keyboard device of the present invention is capable of storing the small size tablet personal computer therein. In case that the keyboard device is in the folded status, the keyboard device is shaped as a rectangular slab. Consequently, the keyboard device can be carried more easily.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A keyboard device for supporting a small size tablet personal computer and storing the small size tablet personal computer, the keyboard device comprising:
   a first casing comprising:
      a first keyboard plate disposed on an inner surface of the first casing, and comprising plural first keys, wherein when the plural first keys are depressed, plural first key signals are correspondingly generated; and
      a first recess formed in the inner surface of the first casing and located at a side of the first keyboard plate for partially accommodating the small size tablet personal computer;
   a connecting plate, wherein a first lateral edge of the connecting plate is connected with the first casing, and the connecting plate is rotatable relative to the first casing; and
   a second casing connected with a second lateral edge of the connecting plate, wherein the second casing is rotatable relative to the connecting plate, so that the first casing and the second casing are collaboratively in a folded status or an unfolded status, wherein the second casing comprises:
      a second keyboard plate disposed on an inner surface of the second casing, and comprising plural second keys, wherein when the plural second keys are depressed, plural second key signals are correspondingly generated; and
      a second recess formed in the inner surface of the second casing and located at a side of the second keyboard plate, wherein when the first casing and the second casing are in the unfolded status, the small size tablet personal computer is permitted to be accommodated within the first recess and the second recess collaboratively.

2. The keyboard device according to claim 1, wherein when the first casing and the second casing are in the unfolded status, the first casing, the connecting plate and the second casing are in parallel with each other, a first included angle between the first casing and the connecting plate is equal to 180 degrees, and a second included angle between the second casing and the connecting plate is equal to 180 degrees, wherein when the first casing and the second casing are in the folded status, the first included angle between the first casing and the connecting plate is equal to or close to 90 degrees, and the second included angle between the second casing and the connecting plate is equal to or close to 90 degrees.

3. The keyboard device according to claim 1, wherein the first casing further comprises a first position-limiting strip, and the first position-limiting strip is disposed on the inner surface of the first casing and located at the side of the first casing, wherein after the small size tablet personal computer is partially accommodated within the first recess, the first position-limiting strip is contacted with the small size tablet personal computer so as to facilitate fixing the small size tablet personal computer in the first recess, wherein the second casing further comprises a second position-limiting strip, and the second position-limiting strip is disposed on the inner surface of the second casing and located at the side of the second casing, wherein after the small size tablet personal computer is partially accommodated within the second recess, the second position-limiting strip is contacted with the small size tablet personal computer so as to facilitate fixing the small size tablet personal computer in the second recess, wherein the first recess is arranged between the first position-limiting strip and a lateral edge of the first casing, and the second recess is arranged between the second position-limiting strip and a lateral edge of the second casing.

4. The keyboard device according to claim 3, wherein the first position-limiting strip further comprises at least one fixing element, and the at least one fixing element is disposed within the first position-limiting strip, wherein when the small size tablet personal computer is placed on and received by the inner surface of the first casing and the small size tablet personal computer is contacted with the first position-limiting strip, the small size tablet personal computer is fixed on the inner surface of the first casing through the at least one fixing element, wherein the first position-limiting strip is rotatable relative to the first casing, so that an altitude of the first position-limiting strip is adjustable.

5. The keyboard device according to claim 1, wherein the first casing further comprises a first position-limiting strip, and the first position-limiting strip is disposed on the inner surface of the first casing and located at a sidewall of the first casing, wherein after the small size tablet personal computer is partially accommodated within the first recess, the first position-limiting strip is contacted with the small size tablet personal computer so as to facilitate fixing the small size tablet personal computer in the first recess, wherein the second casing further comprises a second position-limiting strip, and the second position-limiting strip is disposed on the inner surface of the second casing and located at a sidewall of the second casing, wherein after the small size tablet personal computer is partially accommodated within the second recess, the second position-limiting strip is contacted with the small size tablet personal computer so as to facilitate fixing the small size tablet personal computer in the second recess.

6. The keyboard device according to claim 1, wherein the first casing further comprises at least one fixing element, and the at least one fixing element is disposed on the inner surface of the first casing and located near a lateral edge of the first casing, wherein when the small size tablet personal computer is placed on and received by the inner surface of the first casing and the small size tablet personal computer is contacted with the inner surface of the first casing, the small size tablet personal computer is fixed on the inner surface of the first casing through the at least one fixing element.

7. The keyboard device according to claim 1, wherein the first casing further comprises:
an extension part extended from the first casing, wherein when the first casing and the second casing are in the folded status, the extension part is contacted with the second casing; and
a first locking element disposed within the extension part, wherein when the extension part is contacted with the second casing, the first locking part is contacted with a second locking part within the second casing, thereby maintaining the folded status of the first casing and the second casing.

8. The keyboard device according to claim 1, wherein the first keyboard plate further comprises a wireless transmission module for transmitting the plural first key signals and the plural second key signals to the small size tablet personal computer by a wireless transmission technology, wherein the first keyboard plate is electrically connected with the second keyboard plate, and an overall length of the first keyboard plate and the second keyboard plate is substantially equal to the sum of a length of a lateral edge of the first casing ad a length of a lateral edge of the second casing.

9. The keyboard device according to claim 1, wherein the first keyboard plate further comprises a first wireless transmission module for transmitting the plural first key signals to the small size tablet personal computer by a wireless transmission technology, and the second keyboard plate further comprises a second wireless transmission module for transmitting the plural second key signals to the small size tablet personal computer by the wireless transmission technology, wherein an overall length of the first keyboard plate and the second keyboard plate is substantially equal to the sum of a length of a lateral edge of the first casing ad a length of a lateral edge of the second casing.

10. The keyboard device according to claim 1, further comprising a protective cover, wherein a backside of the small size tablet personal computer is covered by the protective cover, and the protective cover is combined with the small size tablet personal computer, so that the small size tablet personal computer is protected by the protective cover.

11. The keyboard device according to claim 1, wherein the plural first keys of the first keyboard plate at least comprise numeric keys 7~0, alphabetic keys Y~P, alphabetic keys H~L, an Enter key, alphabetic keys N~M, a first Shift key, a first space key, a first Alt key, an up arrow key, a down arrow key, a left arrow key and a right arrow key, and the plural second keys of the second keyboard plate at least comprise numeric keys 1~6, a Tab key, alphabetic keys Q~T, a Caps Lock key, alphabetic keys A~G, a second Shift key, alphabetic keys Z~B, a Ctrl key, a Menu key, a second Alt key, and a second space key.

12. A keyboard device for supporting a small size tablet personal computer and storing the small size tablet personal computer, the keyboard device comprising:
a flexible connecting plate;
a first casing disposed on an inner surface of the flexible connecting plate, and located at a first side of the flexible connecting plate, wherein the first casing comprises:
a first keyboard plate disposed on an inner surface of the first casing, and comprising plural first keys, wherein when the plural first keys are depressed, plural first key signals are correspondingly generated; and
a first recess formed in the inner surface of the first casing and located at a side of the first keyboard plate for partially accommodating the small size tablet personal computer;
a second casing disposed on the inner surface of the flexible connecting plate, and located at a second side of the flexible connecting plate, wherein the second casing is rotatable relative to the first casing, so that the flexible connecting plate is selectively in a folded status or an unfolded status, wherein the second casing comprises:
a second keyboard plate disposed on an inner surface of the second casing, and comprising plural second keys, wherein when the plural second keys are depressed, plural second key signals are correspondingly generated; and
a second recess formed in the inner surface of the second casing and located at a side of the second keyboard plate, wherein when the flexible connecting plate is in the unfolded status, the small size tablet personal computer is permitted to be accommodated within the first recess and the second recess collaboratively.

13. The keyboard device according to claim 12, wherein the first casing further comprises a first position-limiting strip, and the first position-limiting strip is disposed on the inner surface of the first casing and located at a sidewall of the first casing, wherein after the small size tablet personal computer is partially accommodated within the first recess, the first position-limiting strip is contacted with the small size tablet personal computer so as to facilitate fixing the small size tablet personal computer in the first recess, wherein the second casing further comprises a second position-limiting strip, and the second position-limiting strip is disposed on the inner surface of the second casing and located at a sidewall of the second casing, wherein after the small size tablet personal computer is partially accommodated within the second recess, the second position-limiting strip is contacted with the small size tablet personal computer so as to facilitate fixing the small size tablet personal computer in the second recess.

14. The keyboard device according to claim 12, wherein the first casing further comprises at least one fixing element, and the at least one fixing element is disposed on the inner surface of the first casing and located near a lateral edge of the first casing, wherein when the small size tablet personal computer is placed on and received by the inner surface of the first casing and the small size tablet personal computer is contacted with the inner surface of the first casing, the small size tablet personal computer is fixed on the inner surface of the first casing through the at least one fixing element.

15. The keyboard device according to claim 12, wherein the flexible connecting plate further comprises:
an extension part extended from the first side of the flexible connecting plate, wherein when the flexible connecting plate is in the folded status, the extension part is contacted with the second side of the flexible connecting plate;

a first locking element disposed within the extension part; and a second locking element disposed within a second side of the flexible connecting plate, wherein when the extension part is contacted with the second side of the flexible connecting plate, the second locking part is contacted with the first locking part, thereby maintaining the folded status of the flexible connecting plate.

16. The keyboard device according to claim 12, wherein the first keyboard plate further comprises a wireless transmission module for transmitting the plural first key signals and the plural second key signals to the small size tablet personal computer by a wireless transmission technology, wherein the first keyboard plate is electrically connected with the second keyboard plate, and an overall length of the first keyboard plate and the second keyboard plate is substantially equal to the sum of a length of a lateral edge of the first casing ad a length of a lateral edge of the second casing.

17. The keyboard device according to claim 12, wherein the first keyboard plate further comprises a first wireless transmission module for transmitting the plural first key signals to the small size tablet personal computer by a wireless transmission technology, and the second keyboard plate further comprises a second wireless transmission module for transmitting the plural second key signals to the small size tablet personal computer by the wireless transmission technology, wherein an overall length of the first keyboard plate and the second keyboard plate is substantially equal to the sum of a length of a lateral edge of the first casing ad a length of a lateral edge of the second casing.

18. The keyboard device according to claim 12, wherein the plural first keys of the first keyboard plate at least comprise numeric keys 7~0, alphabetic keys Y~P, alphabetic keys H~L, an Enter key, alphabetic keys N~M, a first Shift key, a first space key, a first Alt key, an up arrow key, a down arrow key, a left arrow key and a right arrow key, and the plural second keys of the second keyboard plate at least comprise numeric keys 1~6, a Tab key, alphabetic keys Q~T, a Caps Lock key, alphabetic keys A~G, a second Shift key, alphabetic keys Z~B, a Ctrl key, a Menu key, a second Alt key, and a second space key.

19. The keyboard device according to claim 12, further comprising a protective cover, wherein a backside of the small size tablet personal computer is covered by the protective cover, and the protective cover is combined with the small size tablet personal computer, so that the small size tablet personal computer is protected by the protective cover.

20. The keyboard device according to claim 19, wherein the protective cover further comprises a second fixing element, and the first casing further comprising a first fixing element, wherein the second fixing element is disposed on a lateral edge of the protective cover, and the first fixing element is disposed within the first casing, wherein a combination of the protective cover and the small size tablet personal computer is placed on and received by the inner surface of the first casing, the second fixing element is connected with the first fixing element, so that the combination of the protective cover and the small size tablet personal computer is fixed on the first casing.

* * * * *